United States Patent [19]

Lefebvre

[11] Patent Number: 4,749,487

[45] Date of Patent: Jun. 7, 1988

[54] HIGH FLUX MEMBRANE

[75] Inventor: Michel S. M. Lefebvre, Point Piper, Australia

[73] Assignee: Syrinx Research Pty. Ltd., Australia

[21] Appl. No.: 817,728

[22] PCT Filed: Apr. 10, 1985

[86] PCT No.: PCT/AU85/00078

§ 371 Date: Dec. 6, 1985

§ 102(e) Date: Dec. 6, 1985

[87] PCT Pub. No.: WO85/04593

PCT Pub. Date: Oct. 24, 1985

[30] Foreign Application Priority Data

Apr. 11, 1984 [AU] Australia .................. PG 4531

[51] Int. Cl.⁴ .................................. B01D 13/00

[52] U.S. Cl. ...................... 210/490; 210/500.25

[58] Field of Search ............. 210/490, 500.21, 500.25, 210/506; 55/158; 521/27; 428/212, 304.4, 307.3, 315.5

[56] References Cited

U.S. PATENT DOCUMENTS 4,414,111  11/1983  Iwaisako et al. ............... 210/500.25

Primary Examiner—Frank Sever
Attorney, Agent, or Firm—Basile and Hanlon

[57] ABSTRACT

The instant invention provides a semipermeable membrane having a maximized porosity with surface properties providing enhanced flux, and good chemical resistance.

6 Claims, 6 Drawing Sheets

HIGH FLUX MEMBRANE

FIELD OF THE INVENTION

The present invention relates to a semi-permeable membrane having improved transmission properties (i.e. flux) useful inter alia for the industrial desalting of molasses or milk whey by ultrafiltration.

PRIOR ART

Ultrafiltration is used industrially for the recovery of valuable macro-molecular products, such as proteins, fats and viruses, for example in the recovery of protein from cheese whey. Alternatively, ultrafiltration may be used in depollution applications, such as the removal of soluble oil from industrial waste effluents.

Classical filtration is limited to the retention of particles is sizes greater than 1 to 10 microns. Typical biofilters have a pore size of about 0.1 to 1 micron (10,000 angstrom) and can be used in connection with a filter aid (such as titanium oxide or alumina) which block the large pores of the biofilter to form a dynamic membrane. The filter aid simply rests on the surface of the biofilter and is not attached in any way. Without this, the pore size produced is too large for ultrafiltration applications. Membranes for biofiltration have been developed for particles as small as 0.08 microns (800 angstrom). Below these dimensions ultrafiltration membranes retain molecules with diameters as low as 10 angstrom through a molecular sieve mechanism which in many respects is analogous to filtration. Typical ultrafiltration membranes have pore dimensions in the range 10 to 200 angstrom.

Conventional ultrafiltration membranes have generally been formed of polymers, such as polyamides, polycarbonates and polysulphones. Generally, the ultrafiltration membranes will be either in the form of flat sheet or tubular membranes, or in the form of hollow fibres. However, the use of such organic polymeric systems suffers from a number of disadvantages.

Firstly, the polymeric ultrafiltration membranes are chemically sensitive to extremes of pH and tend to be dissolved by a number of solvents. Since the manufacturing techniques generally involve phase inversion using a solution of the polymer, it is difficult to provide polymers which are sufficiently soluble to allow for ease of manufacture but are resistant to commonly encountered industrial solvents.

More recently ceramic membranes have been developed to give high chemical and temperature resistance. However, these membranes suffer from the same disadvantage as other known membranes, as follows.

Secondly, the total pore area of known ultrafiltration membranes is generally less than 10% of the total membrane surface area. In fact, most commercially available ultrafiltration membranes at present on the market have a pore area less than 0.1% of the total membrane surface. Such low porosity limits the flux of liquid which can pass through the membrane. It is possible to increase the flux by increasing the pressure differential across the membrane, but the maximum flux is limited in use by the build up of a layer of the separated macromolecular species on the membrane. To minimise this build up, the membrane is subjected to a high rate of cross flow (i.e. a high shear rate) of the liquid being filtered. Despite their low porosity, modern membranes have a flux which is limited even at high shear rates by the formation of a layer of separated species at high pressure.

AIM OF THE INVENTION

It is an object of the present invention to mitigate this problem and provide a semi-permeable membrane of higher porosity with surface properties leading to enhanced flux, and of good chemical resistance.

SUMMARY OF THE INVENTION

Broadly, the present invention resides in the provision of a microskin having special properties on a macroporous substrate, such as a conventional biofilter.

Thus, in one aspect the present invention provides a semi-permeable membrane, which comprises a macroporous substrate having a microporous microskin permanently deposited thereon, the microskin having a surface of Fractal geometry.

Another aspect of the invention provides a method of preparing a semi-permeable membrane, which comprises:
  providing a macroporous substrate,
  depositing on the substrate a liquid-containing gel layer,
  removing liquid from the gel layer to produce a microporous microskin having a surface of Fractal geometry permanently deposited on the substrate.

The gel layer is treated to become permanently fixed on the substrate and is shrunk to develop a pleated reticulated Fractal surface. The material of the microskin is chosen to have interactive properties with the molecules being retained to inhibit production of a flat monomolecular layer, and to generate a dynamic layer which is reticulated at the molecular level.

The membrane is useful for any membrane process which suffers from "gel-polarisation" (the formation of a layer of retained molecules which inhibits flux), particularly those driven by pressure, electric field or concentration gradient, such as ultrafiltration, reverse osmosis, electrodialysis, dialysis, and biofiltration.

Since the substrate itself does not constitute the membrane, the material of which it is formed is not critical. The substrate material will be chosen bearing in mind the conditions under which the membrane will operate, and also the conditions required in the formation of the microskin. For example, where the substrate is to be resistant to high temperatures, it may be formed of stainless steel or a ceramic material. Where high solvent resistance is desired, the substrate would preferably be formed of a ceramic material. Where high acid/alkali resistance is required, the substrate might be formed of an inert polymeric material, such as polypropylene. Such substrates are readily available as biofiltration materials.

The gel-layer may be produced of any suitable gelatinous material which can be converted to a permanent microskin on the surface of the porous substrate. Although in principal the gel may contain any polar solvent (e.g. liquid ammonia), usually the gel will be water-containing. Generally, the gel will comprise a multivalent ion, especially a cation such as calcium, aluminium, arsenic, zirconium or silicon. Examples of gels include calcium apatite (usually prepared from milk whey), calcium aconitate (the calcium salt of propene-1,2,3-tricarboxylic acid) and calcium oxalate. Carboxymethyl cellulose may also be used as a substrate additive.

The microskin is one with a Fractal surface. A Fractal surface is one where any continuous curve drawn onto the surface is not differentiable at any point. Examples of natural phenomena exhibiting surfaces with Fractal geometry include snowflakes and elongated crystals. This property of continuity without differentiability has been observed for natural phenomena such as particle trajectories in quantum mechanics and Brownian motion. A Fractal expression may be used to define certain porous media and highly heterogenous surfaces. A discussion of the application of Fractal expressions to transport properties is given in Le Mehaute and Crepy, Solid State Ionics 9 and 10 (1983) 17-30.

In the case of a Fractal membrane, the transport properties at the surface are generally described more accurately at a molecular level in terms of interaction of the retained (i.e. "filtered") molecules with absorption sites and charged sites rather than purely in terms of physical pore sizes. We have discovered that such a Fractal microskin provides a way to pleat the gel layer of the retained species and as such to increase dramatically the maximum flux which can be achieved. In physical terms this may be conceptualised as follows. The maximum flow though a flat microskin is limited by the build up of a two-dimensional monomolecular layer of retained species across the filter surface. On the other hand a reticulated Fractal surface, whose dimensions of reticulation (spacing between adjacent absorption and repulsion sites) are of the same order of magnitude as the Brownian motion of the molecules being filtered, leads to movement of molecules in the third dimension, thereby inhibiting production of a monomolecular layer and allowing increased flux.

To achieve a microskin whose filter transmission properties may be described by a Fractal expression, it is necessary to have an ordered arrangement of absorption/repulsion sites with interactive surface properties with the molecules being retained by the membrane, the sites having at least three different energy levels for these absorption/repulsion phenomena. In practice this may be achieved by using a gel formed from a tribasic compound such as calcium aconitate, aluminium hydroxide or phosphoric acid, which have three different replaceable groups (e.g. hydrogen or hydroxyl) of the same type but different energy levels. The three different energy levels lead to the three-dimensional reticulated Fractal structure when liquid is removed from the gel. However, it may be possible to use divalent compounds, for example where a divalent compound (e.g. calcium hydroxide) is reacted with a mixture of two different acids of slightly different atomic weight to produce a microskin of reticulated structure. The reticulated structure is generated by the molecular rearrangement caused by removal of liquid from the gel.

The Fractal surface is characterised by not polarising light and by exhibiting an angular structure when viewed under the microscope.

Generally, the gel layer is built up by passing a colloid of the material over the porous substrate. In order to prevent the build up of too-thick a layer and to enable good control, a high shear rate is used. The shear rate is preferably in excess of 2000 s$^{-1}$. The shear rate is proportional to the velocity divided by the channel width in the case of a hollow fibre.

The porosity of the final microskin depends on the amount of liquid included in the gel. Thus, high degrees of hydration lead to larger pore sizes and vice versa.

The liquid may be removed from the gel layer by any suitable chemical or physical process. The liquid may be removed partially or completely. For example, liquid may be removed by change of pH, oxidation, hydrolysis or denaturation. The structure of the calcium salts of aconitic acid depends on pH. Water can be gradually dislodged from the gel by progressively changing the pH.

Generally, the gel layer is subjected to a high pressure differential during dehydration so as to compact the layer.

In some cases, the dehydration treatment will be sufficient to permanently fix the microskin to the substrate. However, in other cases it may be desirable to transform the microskin to render it more permanent. Such transformations may include the chemical and physical treatments discussed above. In the case of an organic microskin, this may be subjected to a carbonizing process at very high temperatures, for example using a plasma.

Thus, by the correct choice of materials and conditions, membranes having a high flux may be produced. The membranes may be arranged to have a low tendency to poisoning, to be resistant to extremes of temperature, and to be inert to extremes of chemical conditions, such as pH and solvents.

Embodiments of the present invention will now be described by way of example only.

BRIEF DESCRIPTION OF THE DRAWINGS

FIG. 1 is a schematic cross-section of an ultrafiltration tube which comprises a polycarbonate jacket 1 enclosing a bundle 2 of hollow fibres potted at either end into the jacket using polyurethane potting compound 3. End caps 4 and 5 are attached to the jacket by silicone washers 6 and 7, and are each provided with connectors 8 and 9 for attaching feed inlet and outlet tubes respectively. The jacket is provided with an outlet 10 for permeate which has passed through the ultrafiltration fibres. An outlet 11 provided with a removable screw cap 12 is provided for use during back-flushing of the filter.

DETAILED DESCRIPTION OF PREFERRED EMBODIMENTS

Preparative Example 1

Figure 1:
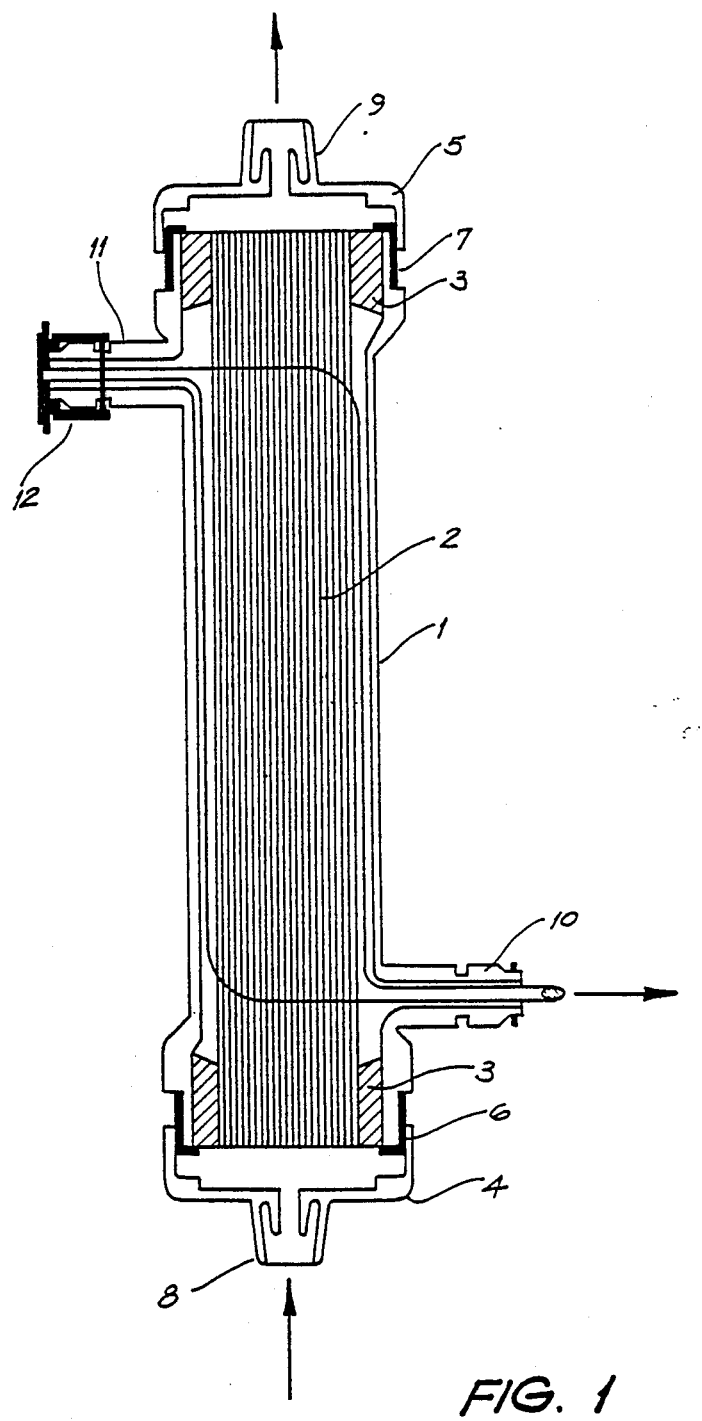
FIG. 1 is a schematic cross-sectional view of an ultrafiltration tube of the type used for both the Fractal tube of the present invention and the controls.

A "Fractal tube" was prepared as follows. A polypropylene biofilter (see FIG. 1) comprising an assembly of 2000 hollow fibres, having an effective area of 0.4 m$^2$, a fibre internal diameter of 313 microns, a fibre length of 185 mm and a pore size of 0.45 microns was cleaned by passing distilled water at 50° C. at a pressure drop of 150 kPa through the filter to remove plasticizer. After a half an hour the flux had stabilised indicating completion of the cleaning.

A molasses solution comprising a mixture of 0.5 wt % calcium aconitate and 0.5 wt % calcium oxalate salts at 35° C. was then passed through the filter at a pressure drop of 150 kPa for 30 minutes at a cross flow rate of 4 liters per minute. The total concentration of the molasses solution was gradually increased from 1 wt % to 8 wt %.

The pH of the solution was then adjusted using sulphuric acid to a pH of 3.6 so as to dehydrate and transform the calcium aconitate gel layer to a Fractal surface.

The filter was then cleaned with Pyroneg (a commercial formulation including surfactant, oxidiser and bacteriostats) to produce the finished ultrafiltration membrane.

The ultrafiltration membrane was found to have a flux of 3 to 5 times higher than conventional polyamide membranes of similar molecular weight cut-off. The membrane showed excellent chemical resistance and could be heated to high temperatures.

Preparative Example 2

A "Fractal tube" having a calcium apatite microskin was prepared using an analogous procedure to Example 1.

Milk whey was acidified to pH 4.6 to precipitate casein. Phosphoric acid was then added to bring the pH down to 2 and to convert the casein to a calcium apatite colloid. The colloid was then passed through the stabilised biofilter tubes to deposit it as a gel on the filter surface. The microskin was reticulated and permanently fixed to the filter surface by addition of calcium hydroxide to change the pH to 7 and to partially dehydrate the calcium apatite gel.

The cleaned ultrafiltration membrane exhibited a three-fold increase in flux compared to conventional polyamide-imide membranes.

EXPERIMENTAL INVESTIGATIONS INTO THE TREATMENT OF INDUSTRIAL WASTE AND PROCESS STREAMS

Laboratory scale trials have been conducted using the Fractal tube of Preparative Example 1 on several streams.

The controls are polyamide-imide membranes having an amphoteric dyestuff grafted on. The physical dimensions are as follows:

TABLE

| | TUBE SPECIFICATIONS | |
|---|---|---|
| | POLYPROPYLENE (FRACTAL) TUBE | POLYAMIDE-POLYMIDE TUBE |
| Surface Area | .04 m$^2$ | D 1.2 m$^2$ <br> F 1.8 m$^2$ <br> X 1.4 m$^2$ |
| Capillary I.D. | 330 um | 200 um |
| No. of Fibres | 2000 | 9–15,000 |
| Length | 185 mm | F 280 mm |

1. THE SUGAR INDUSTRY (a) Molasses Treatment

Research has long been involved in upgrading the quality of final strike cane sugar molasses by removal of salts present, mainly potassium. Reduction of the ash content has benefits in such areas as sugar recovery, fermentation and high protein energy stock food.

A further step to enhance this quality, by the removal of macromolecules and calcium sulphate, has been undertaken using ultrafiltration where the final product is a possible substitute for sweeteners in the food and beverage industry. The major limitation of such a process is the low flux shown by conventional membranes, when operating on viscous molasses feeds at economically viable brix (a measure of viscosity) levels. Evaporation, required to reconcentrate the product for storage, and optimisation of calcium elemination have considerable repercussions on economics.

Figure 2:
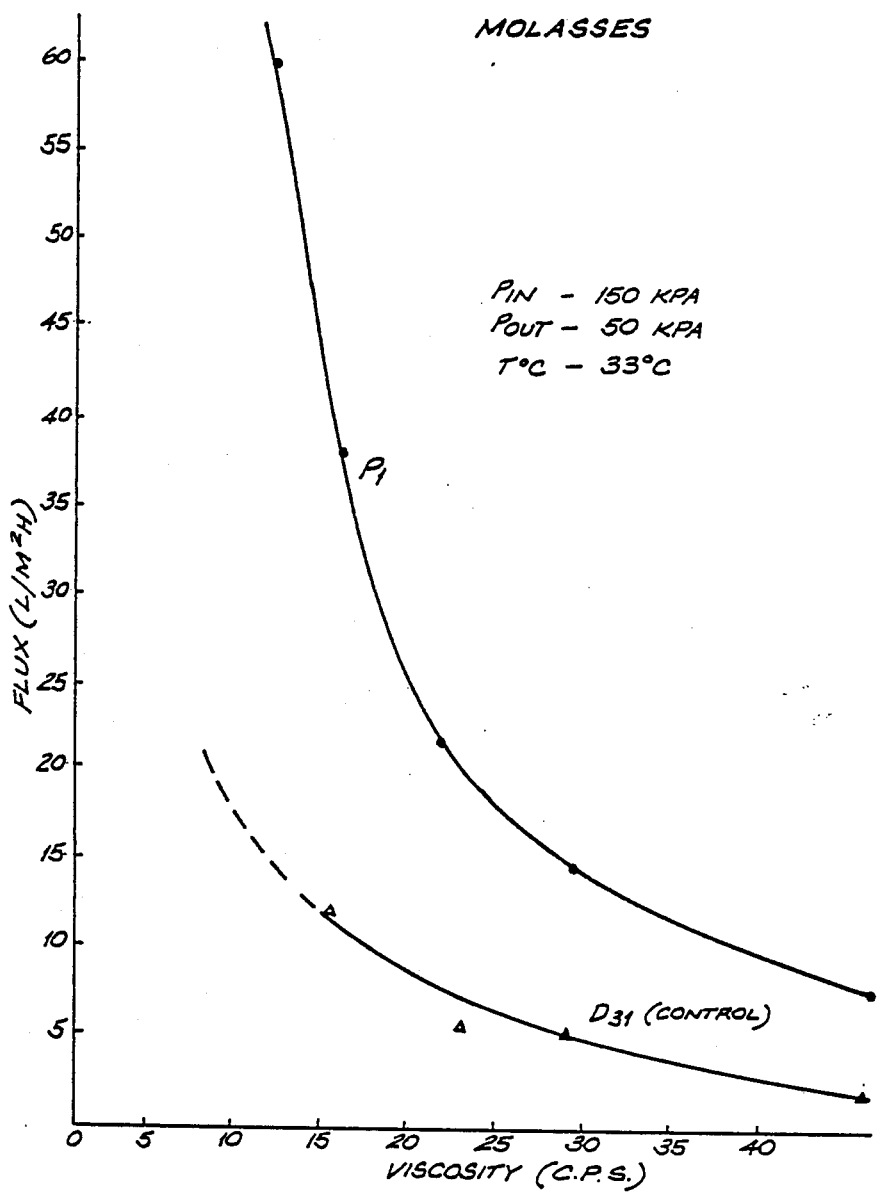
FIG. 2 is a plot of flux versus viscosity for ultrafiltration of molasses solutions.

The performance of the Fractal membrane $P_1$ was compared to the control $D_{31}$ by monitoring the flux and calcium rejection characteristics at various levels of molasses feed viscosity. During the trial a snap sample was taken of the feed and permeate from each tube, and analysed for calcium content. At this point the feed brix was 33° with a pH of 5.35, a temperature of 20° C., and ultrafiltration pressures inlet and outlet of 150 kPa and 50 kPa respectively. Calcium determinations showed a somewhat similar rejection for each membrane. The removal level for the control was 19.6%, and for the Fractal membrane, 17.9%. The flux/viscosity plot of FIG. 2 depicts the superiority of the Fractal tube ($P_1$).

(b) Clarification of Cane Juice

Figure 3:
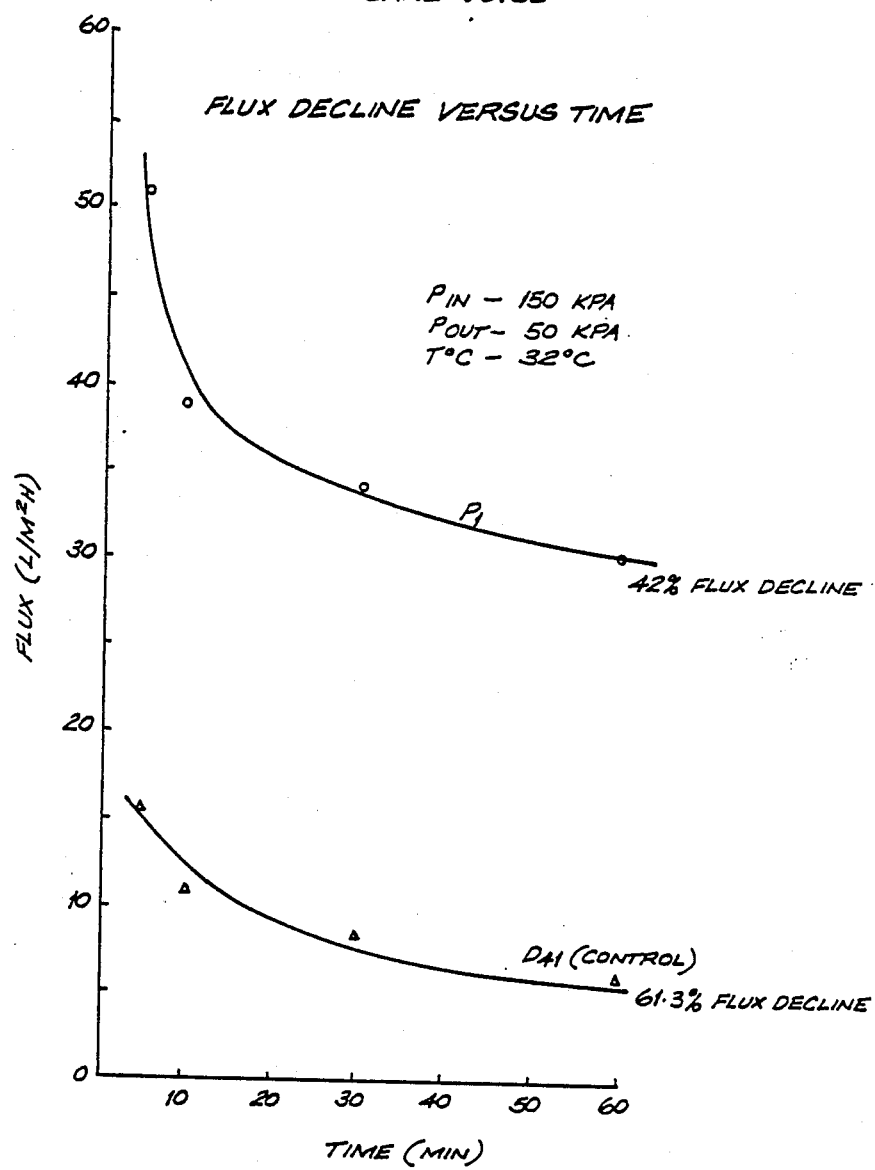
FIGS. 3 to 6 are plots of flux decline versus time for cane juice, skim milk, white wine, and starch factory effluent respectively.
Figure 4:
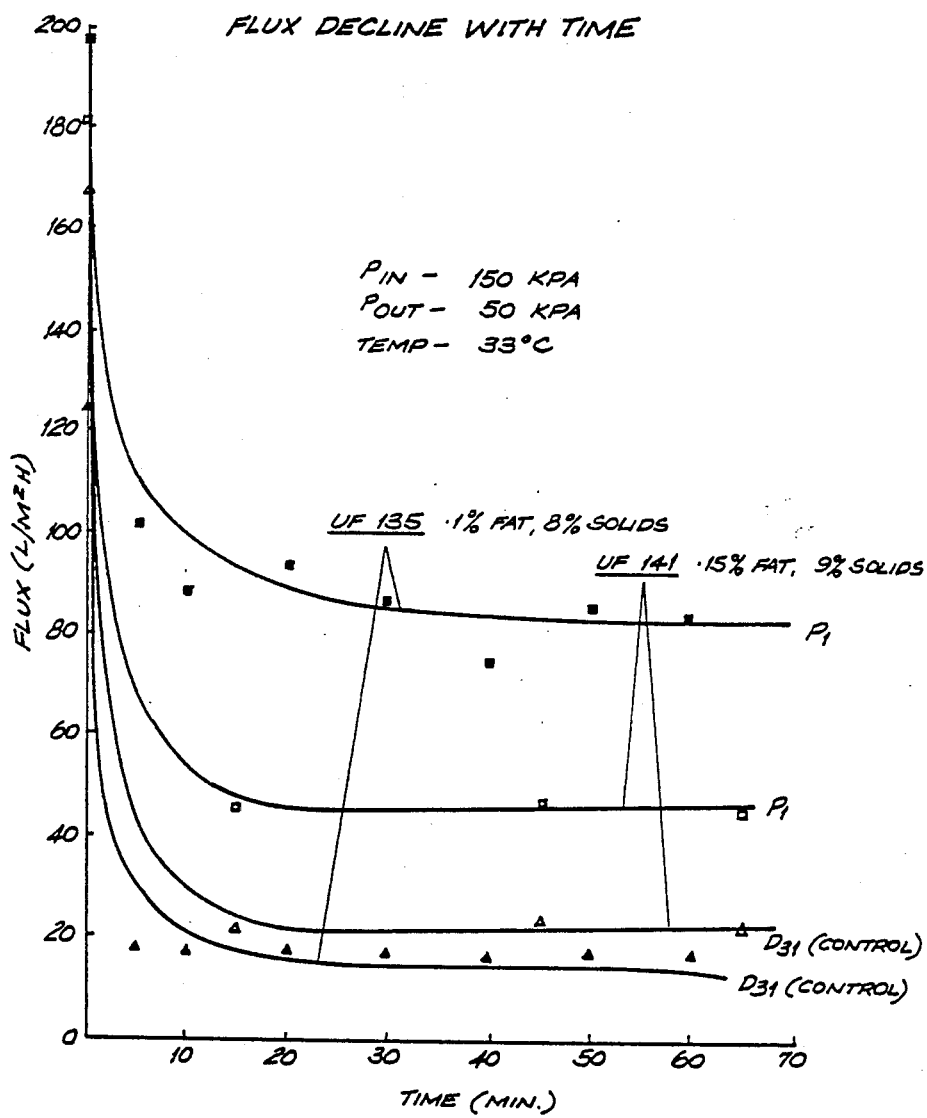

The performance of the Fractal tube ($P_1$) was compared with that of a polyamide-imide control ($D_{41}$) in the ultrafiltration of cane juice. The results are shown in FIG. 3, which shows the decline in flux due to partial blocking of the filter by the cane juice, which is particularly difficult to treat. The results show a much better flux for the Fractal tube, which also has a lower decline (42%) in flux compared to the control (61.3%).

2. APPLICATION IN THE DAIRY INDUSTRY

One of the earliest potential applications of ultrafiltration was the recovery and concentration of protein values from cheese whey. Interest in this process has arisen because of two important benefits: the elimination of troublesome pollutants, and the recovery of milk protein, a potentially marketable, high value, food supplement. The application has been slow to develop, due mainly to two reasons. Firstly, milk proteins are notorious ultrafiltration membrane foulants. Secondly, processing plants require frequent cleaning and sanitizing operations. Failure to remove such foulants results in membrane deterioration and eventual breakdown, resulting in costly membrane replacement.

Laboratory ultrafiltration has been conducted on prepared batches of skim milk. The flux profiles of comparative membranes are illustrated in FIG. 3 for two different whey compositions (UF 135 and 141). The separation of rejection of milk protein by both membranes is of a high level, around 87%. The high flux performance, once steady state, achieved by the Fractal membrane is a two to four-fold increase over the control membrane. The Fractal membrane can be cleaned under vigorous conditions, to remove stubborn foulants and returned to a practical level of water flux, for efficient further use. A standard cleaning cycle was conducted after each of the trials UF 135 and UF 141 and the water flux recorded. In both cases in excess of 90% of the pre-trial water flux was restored. Using an enzyme Alcalase formulation recirculated for 90 minutes, at 50° C., restored in excess of 100% of the membrane's pre-trial water flux.

3. THE WINE INDUSTRY

The use of ultrafiltration has been accepted in the wine industry for the control of "browning" and the reduction in oxidation potential of dry whites by the removal of polymerised phenolic substances. Heat unstable protein has also been effectively removed by this method, as opposed to the method of bentonite fining, a costly undertaking where proteins removed are directly proportional to the quantity of bentonite added. Total heat stability is attained only by use of vast quantities of bentonite. The protein and protein conjugates of wine range in size from small peptides to polymers in excess of 50,000 Daltons, with heat precipitation generally from 10,000 daltons up. Ultrafiltration trials were conducted under laboratory conditions on a "Penfolds White" sampled prior to bentonite fixing, at various temperatures, using the Fractal tube along side other control membrane $F_{41}$.

Figure 5:
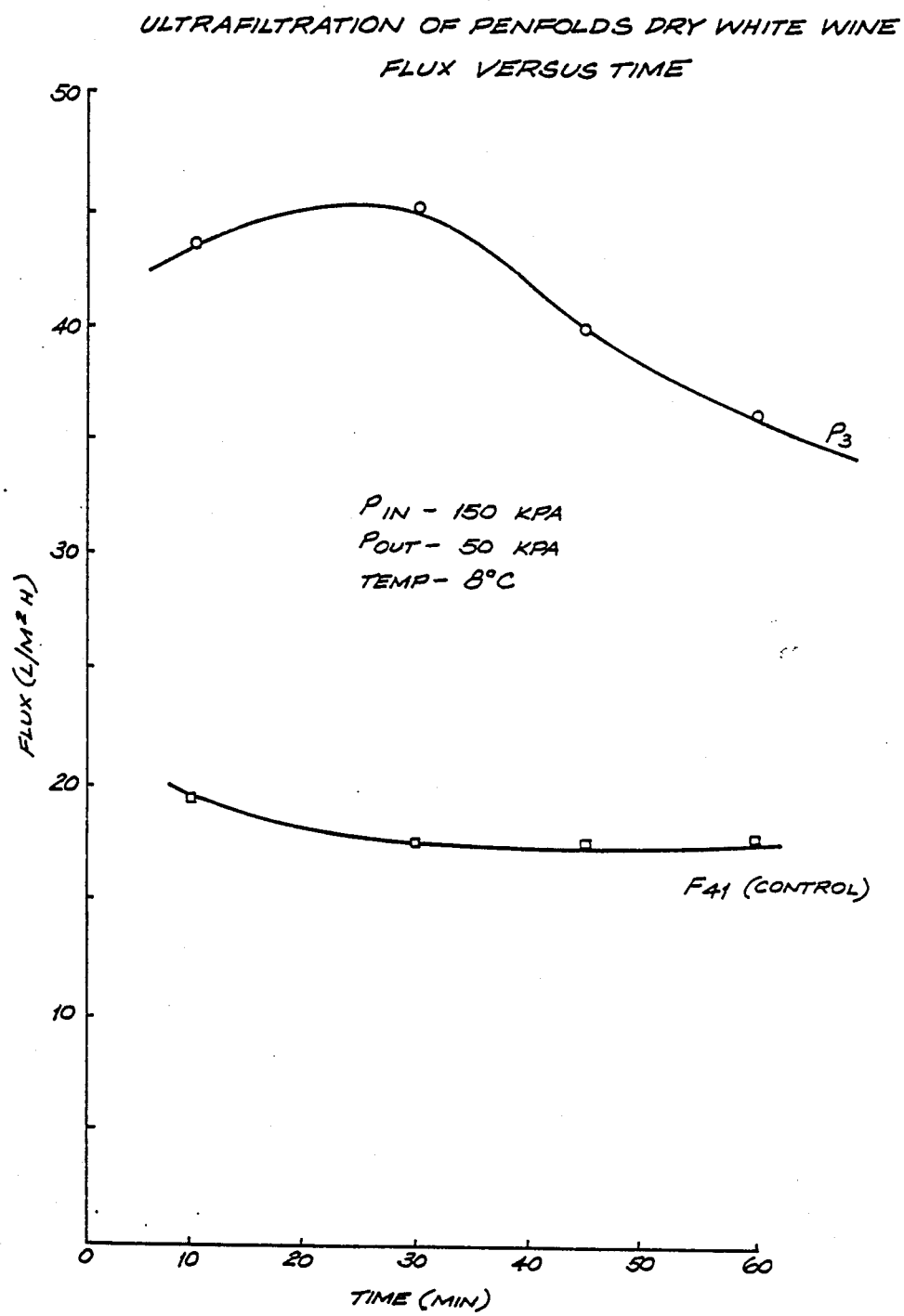

The flux profile at 8° C. is shown in FIG. 5. The Fractal tube outperforms the control by a factor of two.

4. STARCH FACTORY EFFLUENT

Figure 6:
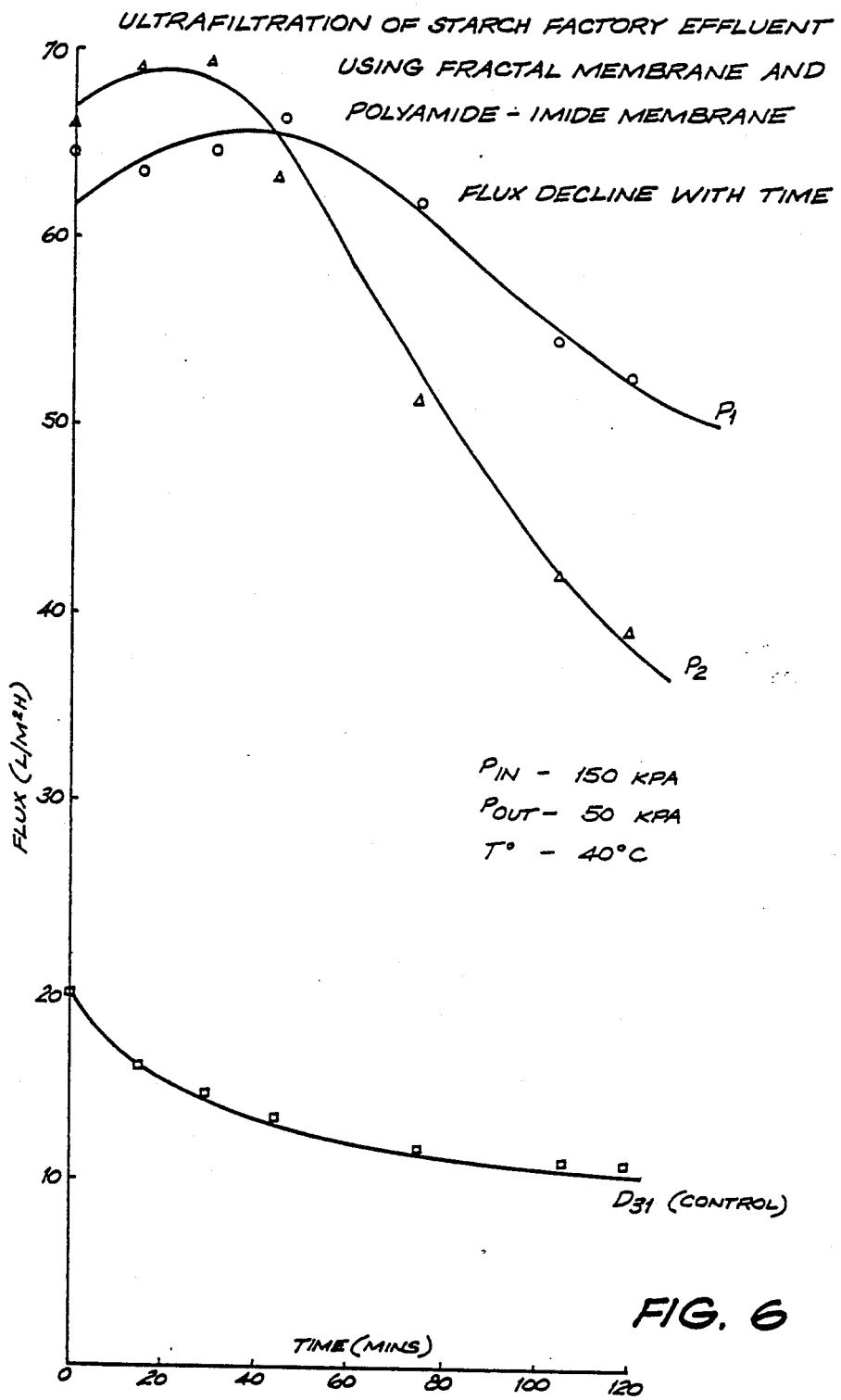

FIG. 6 shows the flux decline with time for two Fractal tubes $P_1$ and $P_2$ in comparison with a control $D_{31}$ in the ultrafiltration of effluent from a flour mill. The effluent contains 0.85 wt% solids comprised mainly of protein and sugars. The flux of the Fractal tubes is at least twice that of the control.

I claim:

1. A semi-permeable membrane for selective retention of molecules of greater than a pre-selected size, which comprises a macro-porous substrate having a micro-porous microskin permanently deposited thereon, the microskin having a surface of Fractal geometry including means for generating a dynamic layer which is reticulated at the molecular level, including an ordered arrangement of absorption/repulsion sites for said retained molecules of at least three different energy levels, the spacing between the absorption and repulsion sites being of the same order of magnitude as the mean free path of Brownian motion of said retained molecules, wherein the microskin is formed of a desolvated gel comprising a tribasic compound selected so as to provide said at least three different energy levels.

2. A membrane according to claim 1 wherein the reticulation spacing is in the region 1 to 20 microns.

3. A membrane according to claim 1 wherein the microskin comprises a multivalent ion.

4. A membrane according to claim 3 wherein the multivalent ion is selected from calcium, aluminium, phosphorus and silicon.

5. A membrane according to claim 3 wherein the microskin comprises calcium apatite.

6. A membrane according to claim 3 wherein the microskin comprises calcium aconitate.

* * * * *